United States Patent [19]
Mulkey et al.

[11] Patent Number: 5,138,268
[45] Date of Patent: Aug. 11, 1992

[54] THICKNESS MEASURING SYSTEM FOR NONCONDUCTING MATERIALS

[76] Inventors: Steve Mulkey, 2687 Hillcrest Dr., Cameron Park, Calif. 95682; Pat Corriea, 9224 Primera Ct., Elk Grove, Calif. 95758; Ed Killian, 2330 Vehicle Dr., No. 26, Rancho Cordova, Calif. 95670; Gordon Lowry, 5729 Engle Rd. #1, Carmichael, Calif. 95608

[21] Appl. No.: 568,367

[22] Filed: Aug. 15, 1990

[51] Int. Cl.⁵ .................................... G01R 27/26
[52] U.S. Cl. ................................ 324/671; 324/674
[58] Field of Search ............... 324/671, 674, 676, 601, 324/662; 364/481, 482

[56] References Cited

U.S. PATENT DOCUMENTS

| | | | |
|---|---|---|---|
| 3,039,051 | 6/1962 | Locher | 324/671 |
| 3,221,171 | 11/1965 | Locher. | |
| 3,341,774 | 9/1967 | Dyben. | |
| 3,471,780 | 10/1969 | Beddows. | |
| 3,519,922 | 7/1970 | Nash et al. | |
| 3,523,246 | 8/1970 | Hall et al. | |
| 3,761,810 | 9/1973 | Fathauer | 324/667 |
| 4,006,411 | 2/1977 | Akagawa et al. | |
| 4,063,167 | 12/1977 | Duly. | |
| 4,071,820 | 1/1978 | Mushinsky. | |
| 4,086,528 | 4/1978 | Walton. | |
| 4,130,796 | 12/1978 | Shum. | |
| 4,208,625 | 6/1980 | Piso. | |
| 4,284,947 | 8/1981 | Walton. | |
| 4,311,958 | 1/1982 | Aeppli. | |
| 4,370,611 | 1/1983 | Gregory et al. | 324/674 |
| 4,433,286 | 2/1984 | Capots et al. | 324/674 |
| 4,630,224 | 12/1986 | Sollman | 364/481 |
| 4,706,014 | 11/1987 | Fabbri. | |
| 4,710,701 | 12/1987 | Strentz. | |
| 4,849,686 | 7/1989 | Lyyra | 324/601 |
| 4,864,512 | 9/1989 | Coulson et al. | 364/481 |
| 4,868,507 | 9/1989 | Reed | 364/481 |

*Primary Examiner*—Kenneth A. Wieder
*Assistant Examiner*—Maura K. Regan
*Attorney, Agent, or Firm*—James M. Ritchey

[57] ABSTRACT

A device and method for detecting the thickness of an essentially nonconducting material during movement of the material within the dielectric between the plates of a capacitance detection probe is disclosed. The detection probe is electrically coupled to a material thickness analysis system containing an oscillator with an output frequency that is a related to the dielectric between the plates. Storage and analysis of output frequencies for the oscillator with and without the nonconducting material between the plates generates material thickness information.

1 Claim, 8 Drawing Sheets

THICKNESS MEASURING SYSTEM FOR NONCONDUCTING MATERIALS

BACKGROUND OF THE INVENTION

1. Field of the Invention

A device is disclosed for measuring the thickness of a layer of nonconducting material during the movement of the material from one location to another. The nonconducting material serves as a dielectric sandwiched between two plates of a capacitance detection probe. A material thickness induced variation in the dielectric between the two electrically conducting plates generates a frequency output alteration in a plate associated oscillator. Storage and analysis of the frequency alteration information is employed to generate a thickness measurement for the nonconducting material.

2. Description of the Background Art

Various devices and methods have been developed to detect the thickness of materials passing a measurement detection point at low to high speeds. Many of these procedures were directed to determining thickness variations in a continuous piece of thread or yarn. Other methods were used with continuous sheets of materials. Some attempted to record the passage of turbine blades at high velocities. These approaches generally rely on detecting a signal generated by the material passing near a detection element, but are often subject to numerous errors due to uncorrected, uncorrectable, or improperly corrected signal generation and analysis.

Both electrically conducting and nonconducting materials have had their thicknesses measured by various techiques, including rudimentary capacitance detectors. However, due to inherent deficiencies in these prior capacitance techniques, variations in surrounding air, machine, and measured material temperatures, machine vibrations, random electronic drift, and like sources of error were not easily corrected or even noticed and introduced inaccuracy in the determined material thicknesses. The subject device and method of use overcome these difficulties.

Disclosed in U.S. Pat. No. 3,221,171 is a method and apparatus for measuring the denier or fineness of yarn or thread using photosensitive or capacitive means. The yarn forms part of the dielectric between detection plates. Simplistic circuits produce measurable voltage fluctuations upon yarn thickness variations.

U.S. Pat. No. 3,341,774 relates a capacitance detector having a transmitter connected to one plate and a receiver connected to another plate. This device eliminates the grounding for one of the detection plates and indicates the drawbacks surrounding grounded detectors.

Delineated in U.S. Pat. No. 3,471,780 is a capacitance thickness gauge comprised of a charged sensing plate sandwiched between primary and secondary grounded plates. The technique claims to correct for moisture content in the measured material and atmosphere. A capacitance meter is employed to monitor variations in the dielectric.

Described in U.S. Pat. No. 3,519,922 is an apparatus for detecting abrupt changes in the thickness of sheet materials. Two sequentially spaced capacitance detectors having an even thickness material passing between them produce similar capacitances. However, if a sudden material thickness change occurs, a difference in dielectric between the two capacitance detectors is noted.

U.S. Pat. No. 3,523,246 shows a method and apparatus for testing a laminar material for irregularities of thickness. The tested laminar material must be at least partly conductive of electricity. An alternating potential difference is applied to the material to be tested between two positions. Recorded potential variations between these two positions reflect thickness deviations.

Presented in U.S. Pat. No. 4,006,411 is a static capacitance type sensor for detecting yarn denier. When yarn is passed through a sensing condenser, the static capacitance is varied and the circuit deviates from the series-resonant position and a variable input will appear at the input terminal of an amplifier.

A blade tip clearance measuring apparatus is shown in U.S. Pat. No. 4,063,167. Rotating turbine blade tips alter the capacitance of a detection probe as they pass nearby. Also, rotating blades are detected by a capacitance sensor described in U.S. Pat. No. 4,071,820. The '820 patent illustrates the general principle of employing a non-contacting sensor that is responsive to an energy manifestation as a function of the spacing between the sensor and the object being measured.

U.S. Pat. No. 4,086,528 discloses a capacitance detector system having one capacitance transducer with at least one capacitor that varies in capacitance in accordance with changes in the dimensions of the quantity being measures and one reference capacitor.

A calibrating and measuring circuit for a capacitive probe type instrument is depicted in U.S. Pat. No. 4,130,796. This device is for gauging the texture of a conducting surface and contacts with the surface to be measured.

U.S. Pat. No. 4,208,625 reveals a capacitive measuring system with automatic calibration. The automatic calibration stems from a comparison routine between an absolute measurement for say the denier of a yarn and a prescribed datum. Continuous monitoring of the characteristics of a moving filament is achieved. Grounding is not associated with the detection capacitor plates since a sensor head forming a capacitance bridge is employed and driven by a signal generator.

The size and shape of a body is determined by the device related in U.S. Pat. No. 4,284,947. The body to be measured is rolled between the plates of capacitors, the dielectric constant of which is thereby altered.

Shown in U.S. Pat. No. 4,311,958 is a capacitive thread motion detector and thread motion stopping device. An alternating current signal is generated during the passage of a thread, with inherent physical irregularities, through a capacitive element, but when the thread breaks or stops the signal disappears and the associated machine is halted.

U.S. Pat. No. 4,706,014 discloses an improved device for measuring the diameter of a dielectric fiber. Key to this invention is the particular shaping of the capacitor plates, such as to allow electric field reductions at the edges to be compensated for and hence capacitance measurements to be unaffected by fiber vibrations.

A capacitive cell for continuous measurement of the linear mass of textile products is described in U.S. Pat. No. 4,710,701. Two identical air capacitors are employed in this device. One capacitor has air as the dielectric and the other has a continuous moving thread. Thread irregularities are detected by comparing capacitance differences between the two capacitors.

SUMMARY OF THE INVENTION

An object of the present invention is to produce an improved nonconducting material thickness detection system and method of use.

Another object of the present invention is to generate an improved thickness detection system and method of use that is capable of measuring the thickness of a nonconducting material without substantial contact with the material being measured.

A further object of the subject invention is to create a thickness measurement system and method of use that reliably reads the thickness of sheets of nonconducting material passing rapidly through a thickness detection probe.

An additional object of the present invention is to effect a thickness measuring system and method of use capable of counting the number of sheets of nonconducting material stacked in a sample sheet packet that passes through the system's detection probe and determining if this sample sheet packet is within a predetermined threshold range based upon a seed sheet packet having a known number of sheets with known thicknesses.

Still a further object of the present invention is to produce an improved capacitance-type thickness measuring device and method of use that yields reliable thickness measurements even with a gradually fluctuating temperature gradient, mechanical wear, or vibrational environment about the device.

Yet a further object of the subject invention is to construct an improved capacitance-type thickness measuring device and method of use that permits accumulated averaging of capacitance information to produce more reliable thickness measurements for nonconducting materials.

The subject invention, a device for detecting the thickness of an essentially nonconducting material during movement of the material on a path from one location to another location, comprises a capacitance detection probe having a grounded first capacitance plate and an oscillator linked second capacitance plate opposing the first capacitance plate. The first and second plates (opposed positionally) are separated by an air space that has a dielectric constant thereby forming a capacitor and giving the capacitor an associated capacitance value. When nonconducting material passes between the plates the air dielectric constant is altered by the presence of the material. A material thickness analysis system, containing the oscillator, is coupled electrically to the second plate. The thickness analysis system comprises oscillator and controller circuits. Within the oscillator circuit is an oscillator that has an output frequency pulse dependent upon the dielectric constant between the plates of the detection probe. Further, the controller circuit is electrically coupled to the oscillator circuit and serves to accumulate, over a predetermined time interval, the oscillator output frequency pulse. Upon specific analysis, the pulse accumulation information reflects the thickness of the nonconducting material.

Other objects, advantages, and novel features of the present invention will become apparent from the detailed description that follows, when considered in conjunction with the associated drawings.

DESCRIPTION OF THE PREFERRED EMBODIMENT

Referring now to FIGS. 1–4, there is shown a preferred embodiment of a device for detecting the thickness of an essentially nonconducting material during movement of that material on a path from one location to another location. The subject system functions around the principle that capacitance is not only dependent upon the area and separation of the capacitance plates, but also upon the dielectric separating the plates. The thickness measuring device enables a user to reliably determine the thickness of the desired material by accumulating and processing, via a material thickness analysis system, an oscillator output frequency pulse generated by passing the material through a capacitance detector or probe electrically connected to the thickness analysis system. Usually, the subject invention is practiced in connection with material transferring equipment that rapidly transfers the subject material or more specifically a sheet packet 6 from one place or location to another. The sheet packet 6 is either a sample sheet packet (thickness being unknown) or a seed sheet packet (thickness being known or initially determined as a standard). The sheet packet 6 contains at least one sheet of nonconducting material such as paper or similar material, but may contain a plurality of sheets stacked essentially on top of one another. Each sheet packet 6 has a leading edge (L. E.) that enters the subject device first and a trailing edge (T. E.) that exits the subject device last. The material to be measured is preferably an individual or unit sample sheet packet 6 containing at least one sheet of paper or paper-like substance (and therefore not a continuous stream of connected matter, but individual disconnected sets of matter), but the material may be noncontinuous, nonconducting materials such as polymer, glass, mineral or similar substances. Also, the subject device is applicable with continuous materials such as yarn or thread, ribbons, and the like.

An example of applicable material transferring equipment or delivery system would be conveyor or belt systems (or equivalent devices and methods of delivery) that move a sheet packet 6 over a path from one location to another location. More specifically, FIG. 1 indicates a paired belt system 9 having a set of paired or opposing belts that sandwiches a sheet packet 6 between both sets of opposing belts and carries the sheet packet 6 through the subject device in the path direction indicated by the arrow A. However, for some applications, one sheet packet 6 may be transferred between each set of paired belts in a staggered or saw-toothed orientation. By adjusting the position of the transferring belts 9, the sheet packet 6 passes through the subject device without having the sheet packet 6 substantially contacting the physical parts of the subject device. Obviously, limiting the physical contact of a sheet packet 6 with the subject device is beneficial in reducing wear on the device and in increasing sheet packet 6 transferal speeds.

Preferably, a sheet packet 6 is one or more mailer insert pages of paper (where an insert may be a printed statement, advertisement, or similar notice and may actually include a surrounding envelope or other container). Movement of the sheet packet 6 may be from a hopper holding a stack of mailer insert pages to an envelope inserter and into an envelope. To determine that only one or a certain number of sheets are inserted into an envelope the subject device is employed during the sheet packet 6 transferring process or after the sheet packet 6 or packets are within a containing envelope. The subject device easily detects the presence of one or more pages within each transferred sheet packet 6 or envelope. The transferring process may be halted if a fault is detected indicating an incorrect number of pages in a sheet packet 6 or within an envelope. Preferably, a visual fault indicator or display is present on or near the probe and if an overseeing computer is used, both the visual display on or near the probe is used and a fault signal is sent to the computer.

Again referring to FIGS. 1 and 2, comprising the subject device is the capacitance detection probe having two electrically conductive capacitance plates. Each plate is fabricated from electrically conducting materials such as: metals, metal alloys, or combination of electrically conducting metals and metal alloys and may include nonmetal conductors and limited quantities nonconducting materials. A first capacitance plate 12 has an outwardly (away from the other capacitance plate) flared sheet packet entry lip 15. The first plate entry lip 15 assists each sheet packet's 6 entry or admission into the volume between the capacitance plates when a sheet packet 6 is moved by an associated delivery system. This first plate 12 is electrically coupled or connected to ground.

Figure 1:
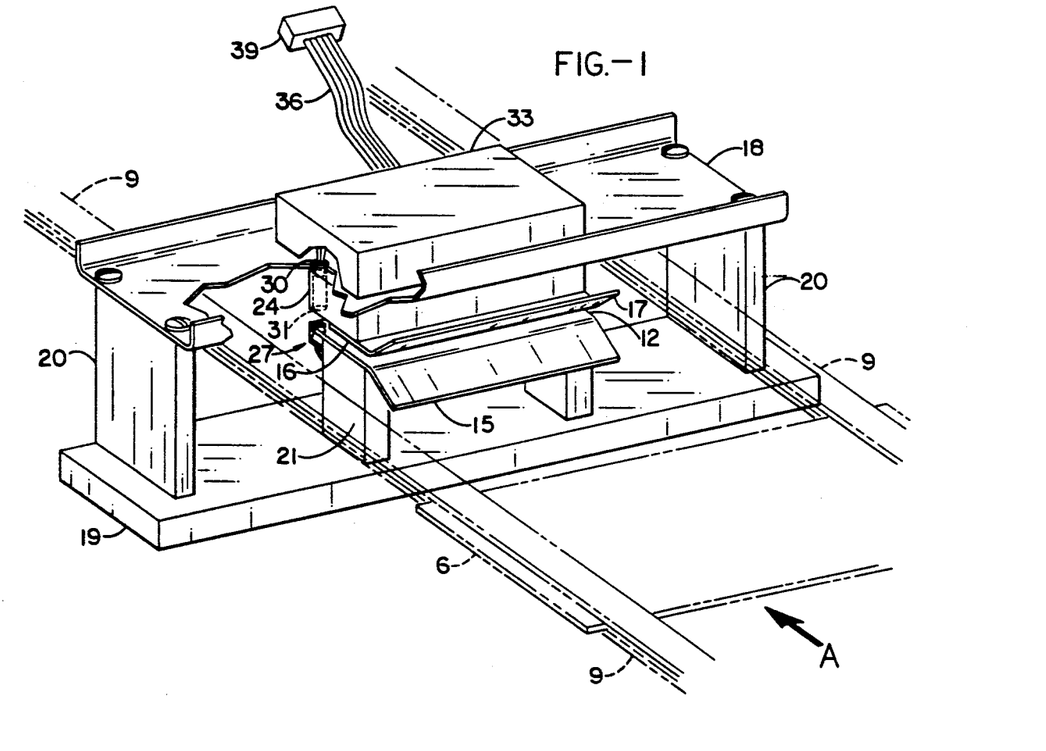
FIG. 1 is a perspective view of the subject device capacitance detection probe and associated oscillator circuit container.
Figure 2:
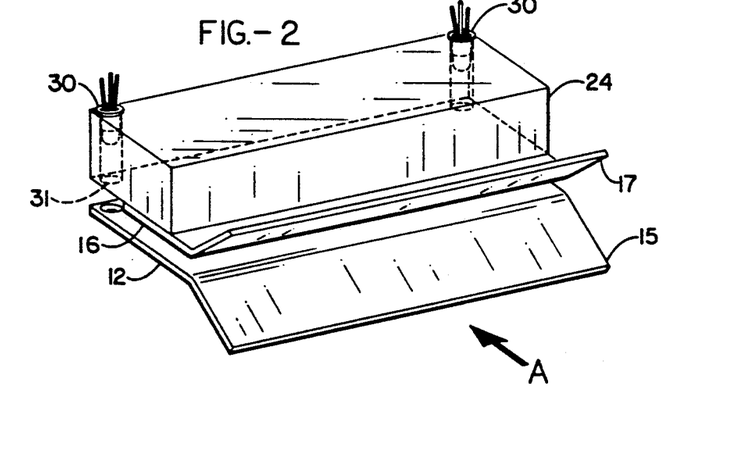
FIG. 2 is a perspective view of the capacitor plates and sensors of the subject invention.

As clearly pictured in FIGS. 1 and 2, opposing the first capacitance plate 12 is a second capacitance plate 16, having a second flared sheet packet entry lip 17 and fabricated from similar material as the first plate 12. The second capacitance plate 16 is linked or electrically coupled to an oscillator (the oscillator being described in detail below). As with the first flared sheet packet entry lip 15, the second flared sheet packet entry lip 17 assists a sheet packet's 6 entry between the plates 12 and 16. Since each sheet packet 6 may consist of only one piece of paper or a few pieces of paper and depending upon the exact delivery conditions, a sheet packet 6 may slightly deform or bend during initial entry into the subject device. Therefore, when a sheet packet 6 is delivered into the subject device between the plates 12 and 16, by an associated delivery system, the flared lips 15 and 17 prevent the sheet packet 6 from getting snagged or caught on the ends of the capacitance plates.

Usually, each generally flattened capacitance plate 12 and 16 is square to rectangular in shape. A typical and preferred plate size is about one to about three inches on one side by about two to about three inches on the other side, preferably about two inches by about three inches, but dimensions from less than an inch on each side to greater than three inches on each side are possible. In FIG. 1 the second plate 16 is slightly smaller in length (from where a sheet packet enters to where it exits), but this is not absolutely required and the first plate 12 may in some cases be smaller in length. Although the square to rectangular shape is preferred, other shapes that function as suitable capacitor plates are contemplated by this disclosure, including circular, triangular, and the like. Further, even though the plates depicted in FIGS. 1 and 2 are generally flat surfaced, plates with undulating or curved surfaces are acceptable.

Between the capacitance plates 12 and 16 is a gap or space that contains a dielectric. The dielectric is air or, when a sheet packet 6 is passing through the gap, a combination of air and the particular material of which the sheet packet 6 is composed, usually paper of one or more sheets. The dimensions of the dielectric gap separating the capacitance plates 12 and 16 is between about 0.01 inch and about 0.5 inch, usually between about 0.05 inch and about 0.25 inch, more usually between about 0.75 inch and 0.15 inch, and preferably about 0.1 inch. The plates 12 and 16 may be permanently fixed within the device to establish this gap distance or be mounted in a fashion that permits a variable gap size.

Surrounding and securing the plates is a frame having an upper frame element 18, a lower frame element 19, and opposing side frame elements 20. Each side element 20 may be one, as pictured in FIG. 1, or more structural pieces that hold the upper 18 and lower 19 frame elements apart. It is within the realm of this disclosure to replace these side elements 20 with equivalent structures. Construction of the frame is by standard procedures from materials such as metals and nonmetals, including polymers, woods, and the like. Each connection joint between the frame component elements is secured by appropriate techniques such as welding, screwing, gluing, melting, and similar methods.

First capacitance plate 12 is secured to the lower frame element 19 by a first plate support 21. If electrically conducting metal is used to fabricate the frame, the first plate 12 may be electrically grounded through the surrounding frame structure by employing a first plate support 21 that is made from electrically conducting material. If a nonelectrically conducting frame or support 21 is used, a separate electrical connection may be employed to ground the plate 12. The first support 21 may comprise one or more structural pieces that run from the lower frame element 19 to the first plate 12. The first plate 12 is fastened to the first support 21 by standard mechanisms such as welds, screws, and the like, including appropriate means for incrementally adjusting the relative position of the first plate 12 within the surrounding frame.

The second capacitance plate 16 is anchored to the upper frame element 18 by a second plate support 24. Since the subject device has the second plate 16 electrically connected to the electronics of the thickness analysis system, this second plate 16 is mounted to the upper frame support 18 by an electrically nonconducting or electrically insulated second support 24. Electrically nonconducting polymers are useful for this mounting and may be fastened by fixed or adjustable means such as screws, glues, welds, or equivalent items.

To aid in detecting the presence of a sheet packet 6 within the dielectric gap between the capacitance plates 12 and 16 and to facilitate proper thickness determinations (the details of this thickness determination are described below), at least one sensor 25 (see FIGS. 1 and 2) for detecting the sheet packet 6 is mounted to or in the frame or to or in plates 12 and 16 of the capacitance detection probe or associated components and electrically connected to the material thickness analysis system of the subject device. Although mechanical, magnetic, light, or equivalent type sensors would facilitate the desired goal of recording the presence or absence of a sheet packet 6 within the dielectric gap, light responsive detection means (an optical or light emitting diode (LED) type sensor) is preferred. Such a standard LED sensor comprises a light sending or emitting element and a light receiving element. The mounting for the sensor may be in any convenient location on the frame, but a preferred site is proximate the sheet packet 6 exiting side of the second plate 16 and proximate or within a receiving opening or sensor aperture 31 that pierces the first capacitance plate 12. As seen in FIG. 1, a first half 27 of a sensor (either emitting or receiving element) is fitted within or mounted in an opening or aperture 31 and a second half 30 of a sensor (the opposite of the one mounted proximate the first plate 12) is mounted to or in the frame element 18 or second plate support 24 proximate the rear edge of the second plate 16 or in plate 16 within sensor aperature 31. When a sheet packet 6 moves between the plates 12 and 16, the light passing between the two sensor halves 27 and 30 is blocked. This blockage is detected by the thickness analysis system and employed in processing, as described below, the accumulated thickness dielectric information.

When two sensors are employed in the subject invention, the second sensor (having emitting and receiving halves) is also associated with the capacitance detection probe. The second sensor halves (as are the first sensor halves) are positioned within a sensor aperture 31 in or proximate to the first plates 12 and proximate the sheet packet 6 exiting edge of the second plate 16 (sensor aperture 31 in plate 16, support 24, or associated with a frame component proximate the sheet packet 6 exiting edge of the second plate 16), see FIG. 2. The second sensor is physically displaced from the first sensor through an angle essentially perpendicular to the sheet packet's 6 movement path between the capacitor plates. As disclosed further below, the second sensor may be employed in detecting if a sheet packet 6 is skewed along the movement path. Such skewing might permit more air and less of the sheet packet 6 in the gap between the plates 12 and 16, thereby changing the dielectric constant and associated apparent sheet packet 6 thickness value. Also, as indicated above, in some applications of the subject device two separate streams of sheet packets 6 may be sent through the detection probe. For a case where two sets of paired conveyor belts are employed, one set of paired belts may be carrying one type of sheet packet 6 and the other set of paired belts carrying another type of sheet packet 6 through the probe.

Figure 3:
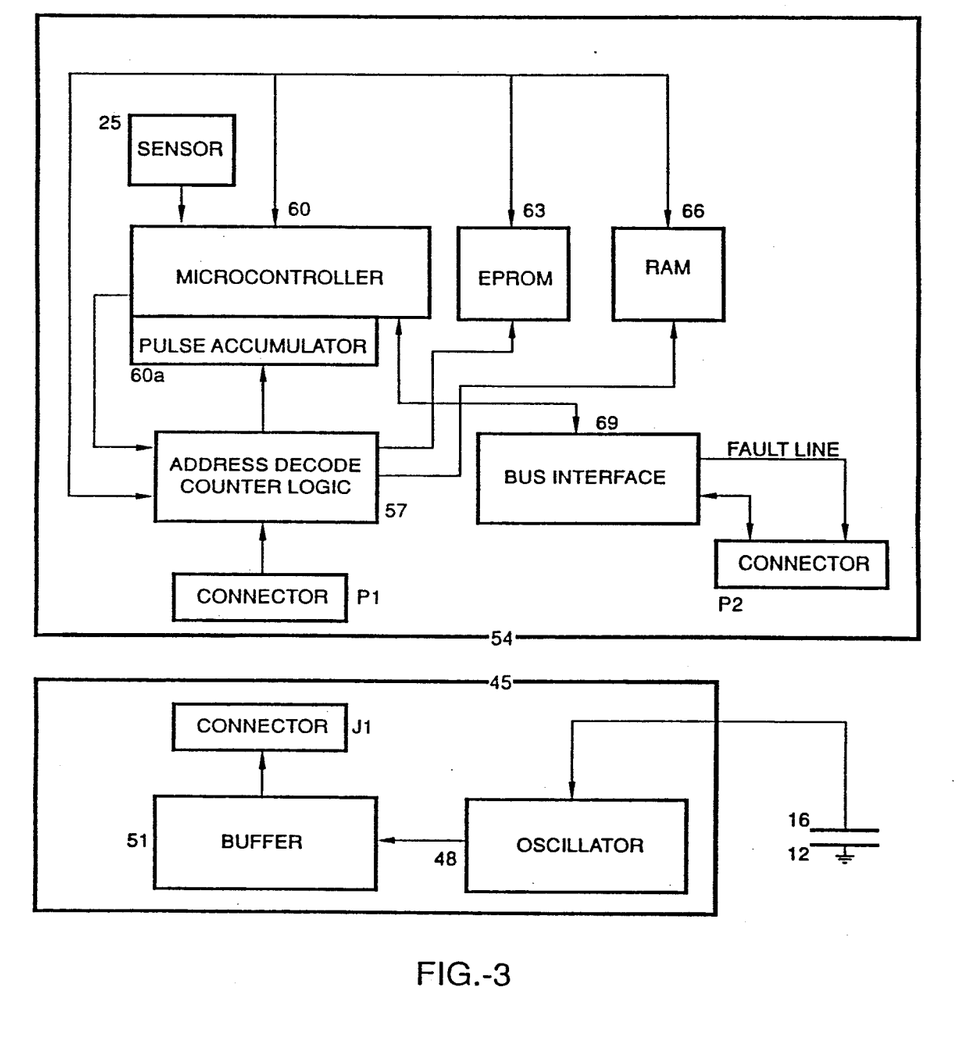
FIG. 3 is a block diagram of the oscillator and controller circuits of the subject device.

Electrically connected to the capacitance detection probe is the material thickness analysis system comprising an oscillator circuit electrically coupled to the second capacitance plate 12 and a controller circuit electrically coupled to the oscillator circuit, see FIG. 3. Although the oscillator circuit may be positioned at a physical location distant to the detection probe, FIG. 1 illustrates a preferred construction of the subject device wherein the oscillator circuit is housed within a surrounding cover 33 over the capacitor plates 12 and 16 and is secured to the frame. To achieve the electrical connection between the oscillator circuit and the controller circuit, a standard multiwire connection cable 36 runs from the oscillator circuit to a connector J1 which mates with connector P1, see FIG. 1 and 3.

More particularly, the paired capacitance plates 12 and 16 form a capacitor that is an integral part of an oscillator's 48 LC (inductance-capacitance) structure within the oscillator circuit. Various types of oscillators (including crystal controlled species and their equivalents) respond to an alteration in their LC structure by oscillating at an altered output frequency pulse that is characteristic of the new capacitance or dielectric constant value. Such capacitance sensitive oscillators would be suitable for the subject device; however, a standard Colpitts oscillator (including traditional vacuum-tube or bipolar transistor versions and their functional equivalents) is preferred. When the dielectric between the plates 12 and 16 is altered from air to that of a sheet packet 6 and the surrounding air, the dielectric constant and therefore the capacitance value changes. The altered oscillator output frequency pulses are usually sent to a buffer 51 that drives these frequency pulses on to the controller circuit via the mated connectors J1 and P1.

Generally, the controller circuit accumulates over a predetermined time interval the oscillator output frequency pulse which reflects the thickness of the material in the sheet packet 6. More specifically, the controller circuit (electrically coupled to the oscillator by way of the intervening buffer 51 and connectors J1 and P1) has an address decode counter logic 57 for addressing any particular capacitance detection probe and counting the oscillator output frequency pulse. For illustrative purposes, a typical output frequency pulse for the oscillator 48 is about 10 Mhz, although other common values are contemplated by this disclosure. It is acknowledged that practitioners in the electronic arts might employ equivalent components, but a standard 4 bit frequency counter is useful to divide the pulse by 16 so the resulting pulse frequency will be low enough for a microcontroller 60. A typical microcontroller or microprocessor 60 is a Motorola MC68HC11 type unit or equivalent device. A standard pulse accumulator circuit 60a accompanies the microcontroller 60.

After the frequency pulse division, the counter output pulse is then fed into the microcontroller's pulse accumulator circuit 60a. The 4 bits of the counter is read by the microcontroller 60 for later use when calculating the total count. The pulse accumulator circuit is generally a counter associated with the microcontroller 60 (generally inside a microcontroller chip) which is readable by the microcontroller 60.

A timer is setup within the microcontroller 60 that defines a determinable time interval, period, or accumulation window. This accumulation window establishes the duration when the pulse accumulator is accepting the counter output.

To illustrate, in an exemplary manner only, an intended use for this accumulation window (and the subject device as a whole), if a sheet packet 6 has a single sheet of paper traveling between the capacitance plates 12 and 16, a certain pulse accumulation count will be gathered within the timer's accumulation window. Due to a dielectric constant alteration, if two sheets of paper are in the sheet packet 6 passing through the probe's capacitor, a different count (as compared against the count from a single sheet of paper) will be gathered in a similar time interval. Therefore, the subject device is easily capable of detecting if a second sheet of paper is being forwarded through the capacitor probe when only one is intended. For the microcontroller 60 to detect this count difference (between one and two sheets of paper), a subtraction routine is initiated wherein a reference count is subtracted from a sample pulse accumulator count which is taken for each sheet packet 6. Should a count difference for a particular sample sheet packet 6 be higher or lower than a predetermined or threshold value (for a seed sheet packet or selected value), the microcontroller 60 will drive its fault line high, thereby signaling more than (or less than, if multiple sheets are used) one sheet of paper within the sheet packet 6.

To facilitate the operation of the controller circuit, appropriately sized instruction containing EPROM 63 and memory RAM 66 components are electrically associated with the microcontroller 60 and address decode counter logic 57. Although a wide variety of suitable values are contemplated as acceptable by this disclosure, typically, the EPROM 63 may contain 12K bytes and the RAM 32K bytes of information.

For communication, the microcontroller 60 of the controller circuit is configured to signal directly personnel (with a visual display reflecting a particular status, usually easily seen LEDs being on of off) or linked with equipment and data collection devices (overseeing computer system) by an interface 69 (such as a RS-422 bus or equivalent mechanism). As in the above specific one or two paper sheet example, a high fault line from the interface 69 to a computer, via connector P2, would indicate more than one sheet had entered the capacitor probe. Upon receiving this fault line signal, appropriate action is initiated by the overseeing computer or personnel.

Further, as indicated above, for detecting the presence of a sheet packet within the plates 12 and 16, a sensor 25 is employed. Sensor 25 signal information is relayed to the microcontroller 60 or overseeing computer and triggers the microcontroller 60 to initiate a delay in the onset of the accumulation window counting (counting delay period) until the sheet packet is totally between the capacitance plates 12 and 16. Additionally, input from more than one sensor 25 is used to establish if a sheet packet 6 is skewed, within the normal orientation of the delivery system, to a degree that requires corrective action. By example, for two sensors 25 mounted to or in the capacitor probe (FIG. 2), if one of the two sensors 25 signals the presence of a sheet packet 6 beyond a predetermined time interval before the second sensor 25 detects the sheet packet 6, the microcontroller 60 or overseeing computer will compare when the first and second sheet packet 6 presence signals were received to determine if the sheet packet 6 is skewed. The microcontroller then prompts an overseeing computer that a skewed sheet packet 6 is present and appropriate action is needed.

Specifically, a typical method of employing the subject device is depicted in FIG. 4. Associated with or within the microcontroller 60 are instructions in the form of "firmware" that direct the operation of the subject device and method of use. As indicated above, the subject invention is capable of not only measuring the thickness of a non-conducting material, but also detecting if single or multiple sheet packets 6 are present and if these sheet packets 6 are "out of tolerance" from expected thickness values (usually expected thickness values may be determined from known "seed" sheet packets and then compared to thickness values for sample sheet packets). Further, the subject firmware contains the capability of communicating faults (any predefined type of fault), status, and commands to and from an overseeing or host computer. Although other languages are appropriate for suitable microcontrollers 60, by way of example, for a Motorola ® 68HC11 microcontroller the firmware routines are written in Motorola ® 68HC11 assembly language. A non-exclusive list of functions that the subject firmware is designed to implement includes the ability to: 1) run the subject device probe in either a "stand-alone" mode (without an overseeing computer) or in a computer interactive mode; 2) automatically generate starting standard quantities or "seeds" for typical sheet packet 6 values such as length, thickness, standard oscillator output values (oscillator seeds), and the like; 3) communicate sheet packet 6 or diagnostic faults to an overseeing computer; 4) detect the presence of single, multiple, or out of tolerance sheet packets 6; 5) detect excessive sheet packet 6 skewing via associated optical sensors; 6) execute global, local, and diagnostic commands sent from an overseeing computer; 7) auto-calibrate the subject device while operating; 8) perform self-diagnostics while operating; execute diagnostic tests or scope loops when commanded by an overseeing computer; and 9) perform like or equivalent operations.

Before the steps shown in FIG. 4 are described in detail, additional information concerning each of the above firmware functions is useful. The subject device will operate with or without being in communication with an overseeing computer. Preferably, the control circuit defaults to the stand-alone mode when a microcontroller reset (accomplished when desired or when starting the device) occurs. To run in the overseeing computer mode, the computer sends an exit command to the microcontroller 60.

In the stand-alone mode the typical functions that are controlled directly by the microcontoller include, but are not limited to: 1) automatically setting operating parameters; 2) generating the necessary seeds from only one seed sheet packet 6; 3) detecting sheet packet 6 thickness and diagnostic faults; 4) automatically clearing, after a short period, sheet packet 6 faults; 5) displaying diagnostic faults on light emitting diodes (these LEDs, not to be confused with the optical or LED sensors, are usually mounted to the frame of the subject device and are easily seen by supervising personnel as a visual display, noted above) that are associated with the subject device and thereby disabling the subject device until the problem (noted fault) is rectified; 6) while the subject device probe is active, displaying the optical sensor status or activity on the supervising personnel observable LEDs; and 7) verifying the proper operation of the oscillator during employment of the subject device.

The computer interactive mode is a much more versatile configuration for the subject device than the stand-alone mode. In this computer interactive mode the typical functions that are controlled by an overseeing computer include, but are not limited to: 1) setting microcontroller parameters such as; sheet packet 6 thickness thresholds for minimum and maximum thickness values that indicate the presence of a single or multiple sheet packet 6; skew detect enablement; seed generation enablement; sheet packet 6 timing to establish when a sheet packet 6 is to be measured; subject device probe enablement; and the like; 2) generating sheet packet 6 seeds by sampling one or a plurality, preferably, three sheet packets 6; 3) clearing all sheet packet 6 and diagnostic faults; 4) checking the subject device probe to verify proper functioning and noise level activity; 5) performing diagnostics on the microcontroller 60; and 6) conducting similar or analogous operations.

The subject device is capable or automatically generating the thickness, length, and oscillator seeds (standard or averaged standard values for a desired parameter from one or more seed sheet packets). This process eliminates the need for an operator to input data manually, which greatly reduces the human error factor.

When any predetermined fault (known and entered into the microcontroller's firmware) occurs, the microcontroller 60 drives its fault line to a logic zero. When operating in the computer interactive mode, the fault line can only be set to a logic one (inactive) by an overseeing computer. However, while operating in the stand-alone mode the microcontroller 60 automatically clears the fault line after a short delay.

One operational technique for the subject device is to detect sample sheet packets 6 that are out of tolerance for thickness. This computer interactive mode involves a detection algorithm comprising: 1) sampling the capacitance of typically three seed sheet packets 6 by the subject probe; 2) sending this three seed sheet packet 6 thickness information to an overseeing computer for processing; 3) determining, via the overseeing computer, the threshold values that indicate acceptable thickness variances; 4) sending the threshold values to the subject probe; and 5) employing, by the microcontroller 60, the threshold values to verify that any passing sample sheet packet 6 is within the threshold value range and if a sample sheet packet 6 falls outside the threshold limits, a fault is generated.

Another operational technique for the subject device is to detect if more than one sheet (or more than any desired number) is within a sample sheet packet 6. This computer interactive mode involves a detection algorithm comprising: 1) sampling the capacitance of generally three single seed sheet packets 6 by the subject probe; 2) generating the thickness seed by calculating the average of "two out of the three" lowest seed sheet packet 6 values; 3) using the average value just determined as a base line, the overseeing computer sets a percentage parameter (typically plus or minus about 25% to about 50%); and 4) generating a fault if any sample sheet packet 6 falls outside the threshold limits. Preferably, to account for oscillator drift in calculating the upper and lower threshold values, an average of the last ten sheet packets 6 is used. Additionally, the microcontroller auto-calibrates the oscillator reference point from numbers calculated from the capacitance probe output. This calibration accounts for temperature variations, vibrations, and any long term frequency shifts due to aging parts.

As indicated above, for detection of a skewed sheet packet 6, two optical sensors 25 are employed and send their information into the microcontroller 60. For a sheet packet 6 moving through the plates 12 and 16 at a particular speed, the amount of skewing between the toggling (blocking and passing of the emitted light by a sheet packet's 6 presence or absence) of both sensors 25 is held to a specified time. If this time is violated, the sheet packet 6 is skewed. Also, if either one of the two optical sensors 25 does not toggle (on or off) when the other one does, the microcontroller detects this conditions and reports it as a fault.

It must be appreciated that more than one thickness determining probe may be coupled to an overseeing computer (one example being when many different single page or multiple page informational sheet packets are to be merged and inserted into one envelope and not more than one of each is desired). The overseeing computer synchronizes the required multiple probes with their associated microcontrollers. The microcontrollers will be interrupted by the RTS line and place their UARTs in interrupt-on-receive mode. The byte that all of the microcontrollers will read is either the address of the microcontroller that the overseeing computer wants to communicate with or a global command that will address all of the microcontrollers. If a particular probe address is send, then all the microcontrollers read their DIP switch setting and the ones with no address match return to the RTS ready mode. The remaining microcontrollers continue to listen to the overseeing computer, executing local commands. Addressed microcontrollers quit listening to the overseeing computer when the RTS goes inactive. If a global command is sent, then all of the microcontrollers are addresses and continue to listen to the overseeing computer, executing global commands, until the RTS goes inactive.

Each microcontroller executes self diagnostics at power-up and while in either operational mode. The power-up diagnostics test the external memory (preferably 32K) and the oscillator for proper operation. The oscillator is monitored while in either (stand-alone or computer interactive) operational mode to assure that it is operating within a specified range. The optical sensors are monitored for toggle on and off times to assure that the capacitance probe is alive (functioning) and to keep the capacitance probe from locking up in the optical sensor routines.

Each microcontroller circuit or board has built-in diagnostic test routines and scope loops to assist in the repair of a faulty board. The diagnostic routines are executed when commanded by an overseeing computer. To run a diagnostic test or scope loop, a technician selects an option from a program such as: 1) select the desired diagnostic test option, then wait for the test results to be displayed on a monitor or 2) select the desired scope loop option, then go scope the suspected faulty circuit.

For a sheet packet 6 traveling at a particular velocity within the capacitor probe, timing is an important issue (to insure data is sampled within the material to be measured). By way of example and not by way of limitation, for capacitance plates that are one and five eights inches in length (along the path of sheet packet travel) and an optical sensor placed 0.2 inch after the plates, the following Table 1 indicates typical data values (NOTE: The start delay takes into account the 0.2 inch spacing between the sensor and the capacitance plates and the following numbers are based on a sheet packet length threshold set at 25% with a maximum sheet packet length of 3.5 inches):

TABLE 1

| SAMPLE | 1 | 2 | 3 | 4 | 5 |
|---|---|---|---|---|---|
| INSERT SPEED (ms per inch) | 28.6 | 20.0 | 13.3 | 11.7 | 10.0 |
| DISTANCE MOVED IN 10 ms (inches) | 0.35 | 0.50 | 0.75 | 0.85 | 1.00 |
| START DELAY (ms) | 24.3 | 14.0 | 5.9 | 4.7 | 4.0 |
| SENSOR START | 1.05 | 0.90 | 0.65 | 0.60 | 0.60 |

TABLE 1-continued

| SAMPLE | 1 | 2 | 3 | 4 | 5 |
|---|---|---|---|---|---|
| (inches) SENSOR STOP (inches) | 1.40 | 1.40 | 1.40 | 1.45 | 1.60 |
| EXIT DELAY (ms) | 28.0 | 20.0 | 13.0 | 10.0 | 8.0 |
| MAX ALLOWABLE INSERT SKEW PER 0.7 INCHES (ms) | 20 | 14 | 9 | 8 | 7 |

FIGS. 4a–4f detail an exemplary flow diagram for the both the stand-alone (FIGS. 4a, 4b, and 4c) and computer interactive (FIGS. 4a, 4d, 4e, and 4f) modes of the subject device. The above general discussion should be kept in mind while reading the following clarifications concerning the flow diagram. First, the hardware is reset at step 72 and the microcontroller is initialized at step 75 with appropriate system parameters. Internal tests at step 78 are conducted to verify the proper functioning (oscillator output within a given range, memory, an the like) of the system. The program asks if a diagnostic test failure occurred at step 81 and if so which one at step 84 and an error code is flashed at step 87 on LEDs that are mounted on the capacitance probe. If no diagnostic failure has occurred the system enters the stand-alone mode at step 90.

Figure 4A:
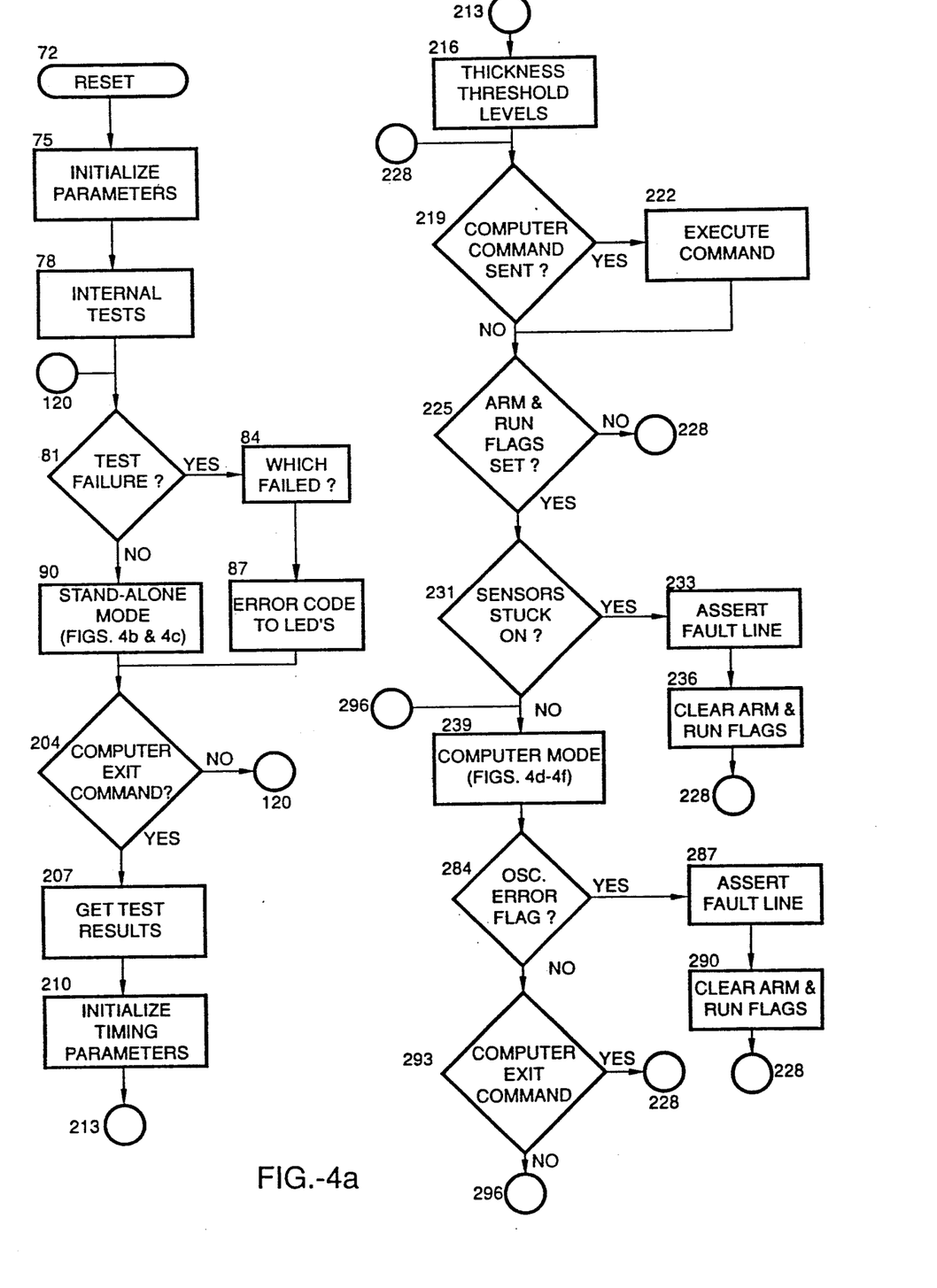
FIG. 4a is an overall informational flow chart illustrating events occurring during the general operation of the subject device.
Figure 4B:
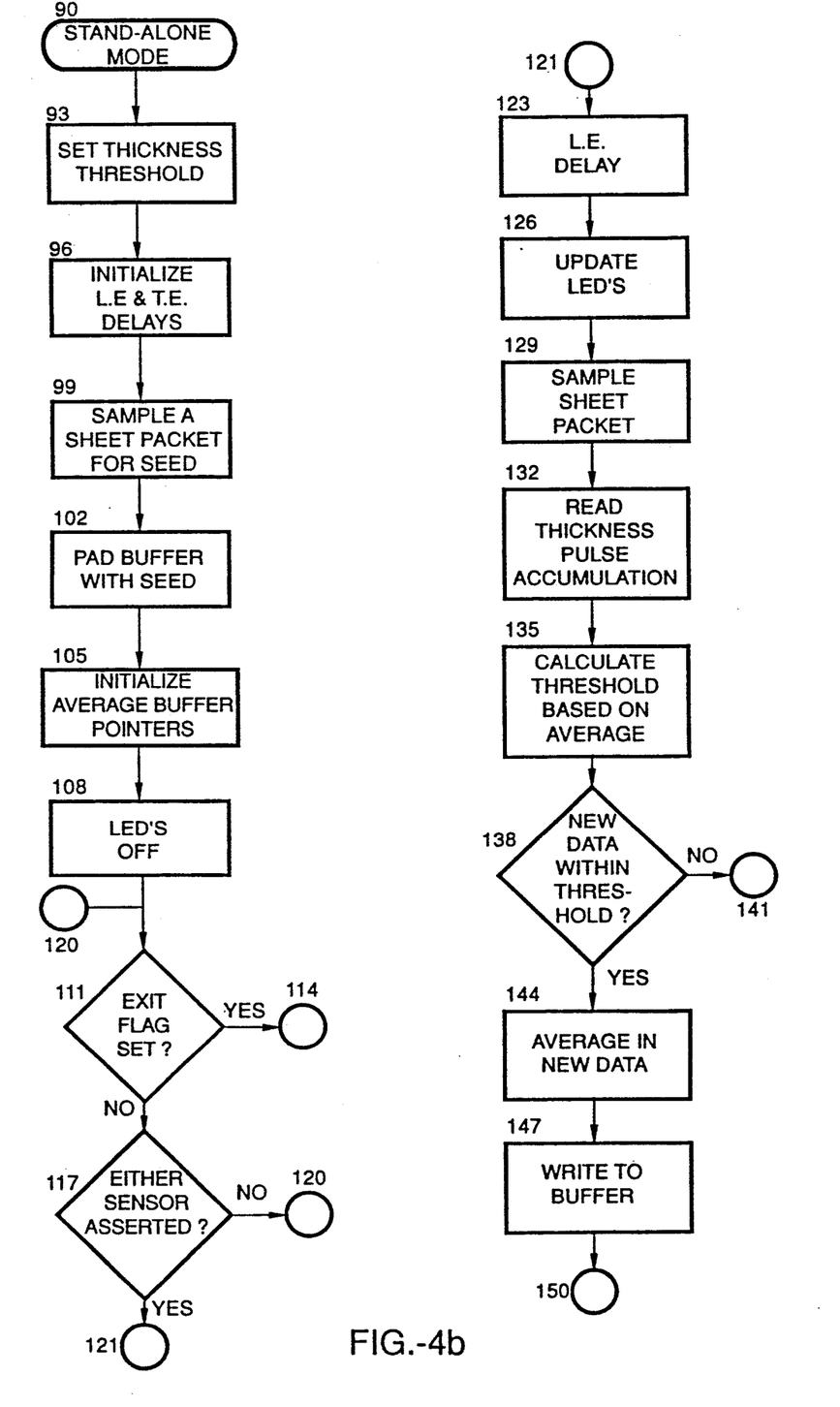
FIGS. 4b and 4c show the informational flow chart for the stand-alone mode of the subject device.
Figure 4C:
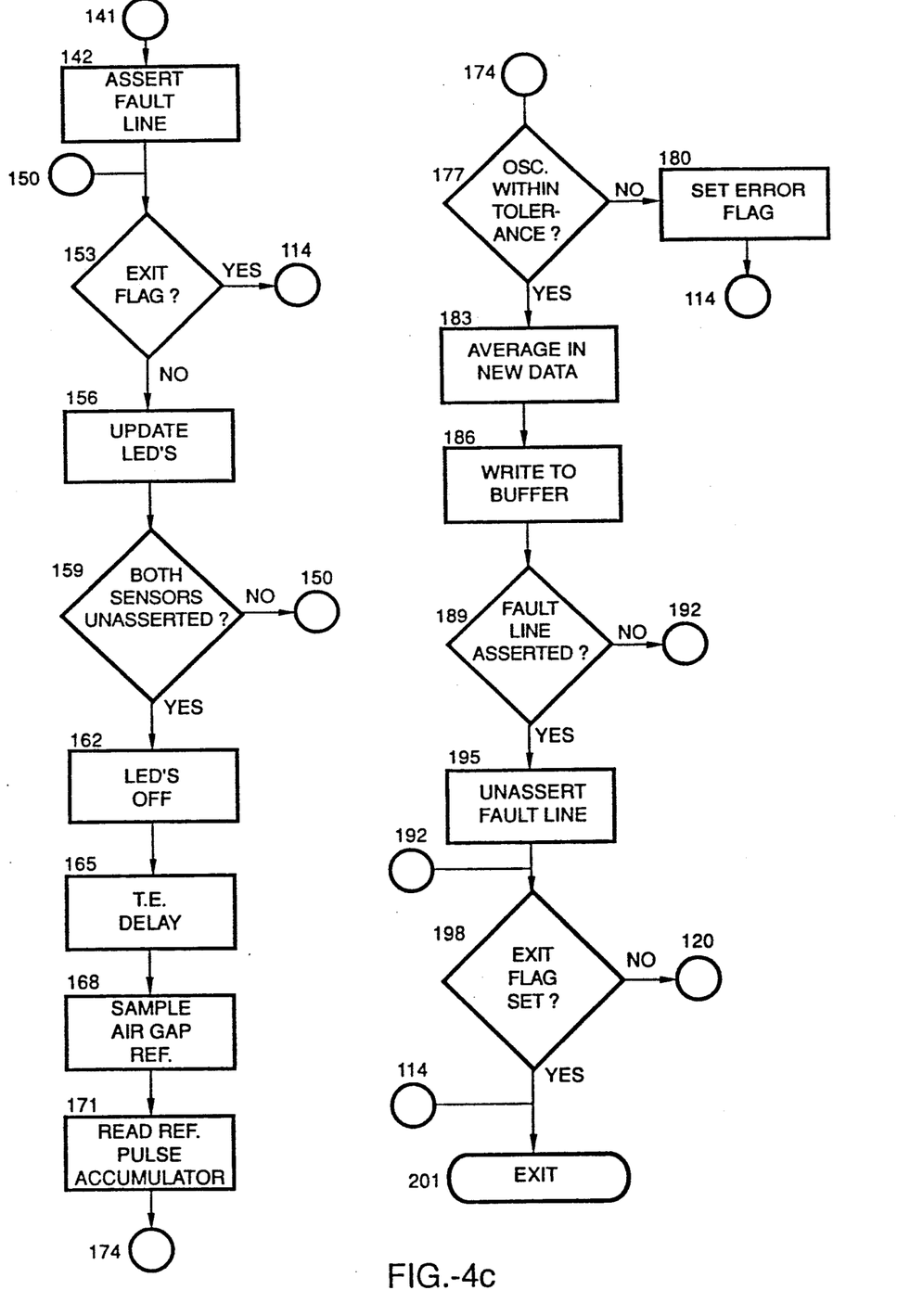

FIGS. 4b and 4c represent typical informational flow during a stand-alone operation of the subject device in which no overseeing computer is involved in the process. To illustrate a generalized use of the subject device, an example using the system to detect if more than one sheet of paper is within the sample sheet packet 6 is given. The sheet thickness threshold value is set at step 93, usually to plus or minus 50% (see above), but could be varied to any desired value. Using the sheet packet leading edge (L. E.) and trailing edge (T. E.) the delays are set at step 96 to assure the sheet packet 6 is within the probe before measuring its thickness.

To establish the accepted or known thickness seed values in the stand-alone mode, one seed sheet packet 6 is sampled at step 99 (seed sheet packet between the plates) and after the seed sheet packet exits the probe the oscillator reference is sampled (air between the plates). These seeds are then placed or padded into the thickness and oscillator reference buffers at step 102. These buffers usually have locations to accept a total of ten seed values, but since in the stand-alone mode only one seed sheet packet is usually sampled, all ten locations are padded with the same value. To update the thickness and reference (between sheet packet or air values) buffers by reading and writing processes, corresponding pointers are initialized at step 105.

To confirm that the LEDs mounted on the probe (to indicate visually the status of the system without an associated computer) are functioning, both LEDs (two LEDs are employed in this example) are turned off at step 108. If the exit flag is set at step 111, the program exits at step 114 the routine. If the exit flag at step 111 is not set, the program goes to see if either of the two optical sensors is asserted at step 117 (since one sheet packet 6 could be sent through the subject probe via each set of the paired conveyor belts, only one optical sensor needs to assert for a thickness measurement) and if no, the system loops to the indicated location 120 until one of the optical sensors is asserted. The optical sensors are routinely debounced. If one optical sensor is asserted, the program goes to a step (via 121 in FIG. 4b) that delays at step 123 the thickness measurement from the leading edge of the sheet packet 6. The visual LEDs are updated at step 126 and the oscillator output is sampled at step 129 for about 10 ms to generate and store the thickness data, but this time could vary. The pulse accumulator counter is then read for the stored thickness data at step 132.

The program then calculates at step 135 the upper and lower sheet packet thickness threshold values based on the average of the last ten sheet packet thickness readings. Generally, this step involves the ten thickness values placed in the buffer, which would all be the same for the first seed case, but then be updated as each new acceptable thickness reading displaces the oldest prior reading (a FIFO or first-in-first-out process). This process creates a constantly updated average. The upper and lower sheet packet thickness threshold values are usually set to be plus or minus 50% of an updated average thickness. At this point, the new or current thickness data is compared to the calculated thresholds at step 138 and if outside that range the routine branches at step 141 to assert a fault line at step 142, but if within that range, the new thickness value is averaged in with the prior ten values at step 144 and written at step 147 into the data buffer to replace the oldest prior data value.

Following step 150 the updating of the data buffer, the program checks to see if an exit flag is set, exiting if set to exit at step 114, and going on to update at step 156 the status of the visual LEDs if not set to exit. The program asks if both of the optical sensors are asserted at step 159 and if no, loops back at step 150, but if both are unasserted, then both visual LEDs are turned off at step 162. Next the sheet packet trailing edge delay is set at step 165 and an approximately 10 ms sample is taken of the oscillator output at step 168 and stored in the pulse accumulator counter. This is a reference value for air between the plates 12 and 16. The oscillator reference data from the pulse accumulator counter is read at step 171 and the program continues via step 174 on to verify if that reference data is within the operating range or tolerances of the oscillator and if not at step 180, an error flag is set and the routine exits at step 114. If the oscillator reference data is within tolerances, the program averages at step 183 in the new reference data with the last ten reference values. As with the thickness measurements, the new oscillator reference data is written at step 186 in the ten locations within the buffer in a first-in-first-out process.

The program then checks to see if the fault line is asserted at step 189. If yes, then the fault line is unasserted and if no, continues via step 192 to see if the exit flag is set at step 198. With no exit flag, the program loops back at step 120 to start the sampling process again. With an exit flag, the routine exits at step 201.

Now back to FIG. 4a for the operation of the computer interactive mode. If an overseeing computer is linked to the subject probe, the program checks to see if an exit signal was sent at step 204 and if no, the program loops at step 120, but if an exit signal was sent, the computer sends a command to get the test results at step 207. According to the speed of the conveyor belt carrying the sheet packet (see above), the computer initiates the timing parameters at step 210. The program continues via step 213 and initiates the thickness threshold level at step 216. this threshold level could be the same as with the general stand-alone mode (plus or minus 50%), but is easily varied to any value. If the computer sends a command (global, local, or diagnostic) at step 219, the command is executed at step 222, but if no such command is received, a check is made to see if the arm and run flags are set at step 225 (keeps the microcontroller at this point until the sheet packets are ready to go). If no arm and run flags are set, the program loops at step 228, but if armed and ready (sheet packets ready to go), the program proceeds to see if the optical sensors are stuck on at step 231 (the conveyor belts should be cleared at this point). Should the sensors be stuck on, the fault line is asserted and an error code set at step 233, followed by a clearing of the arm and run flags at step 236 and a looping at step 228.

Figure 4D:
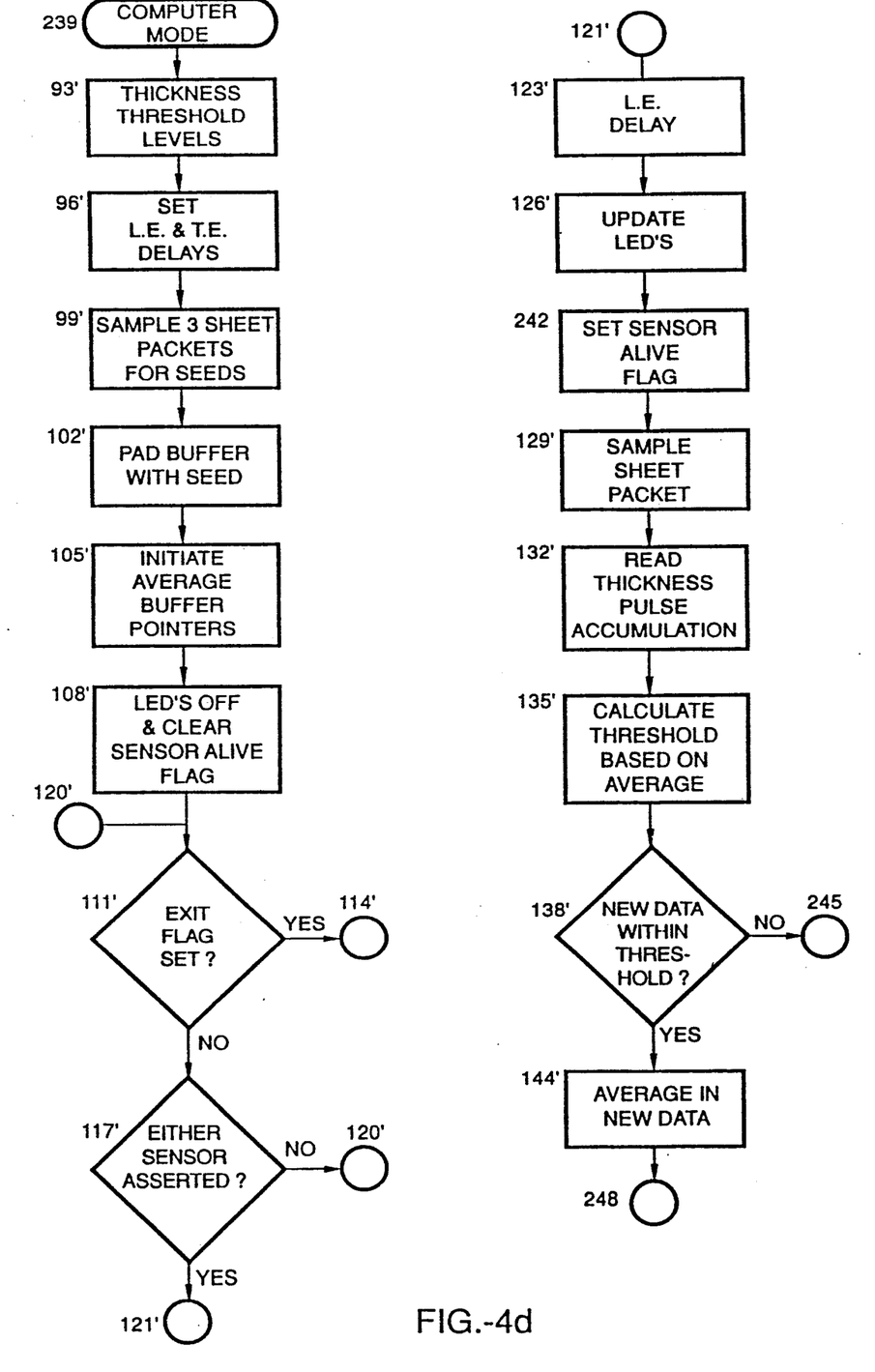
FIGS. 4d, 4e, and 4f depict the informational flow chart for the computer interactive mode of the subject device.
Figure 4E:
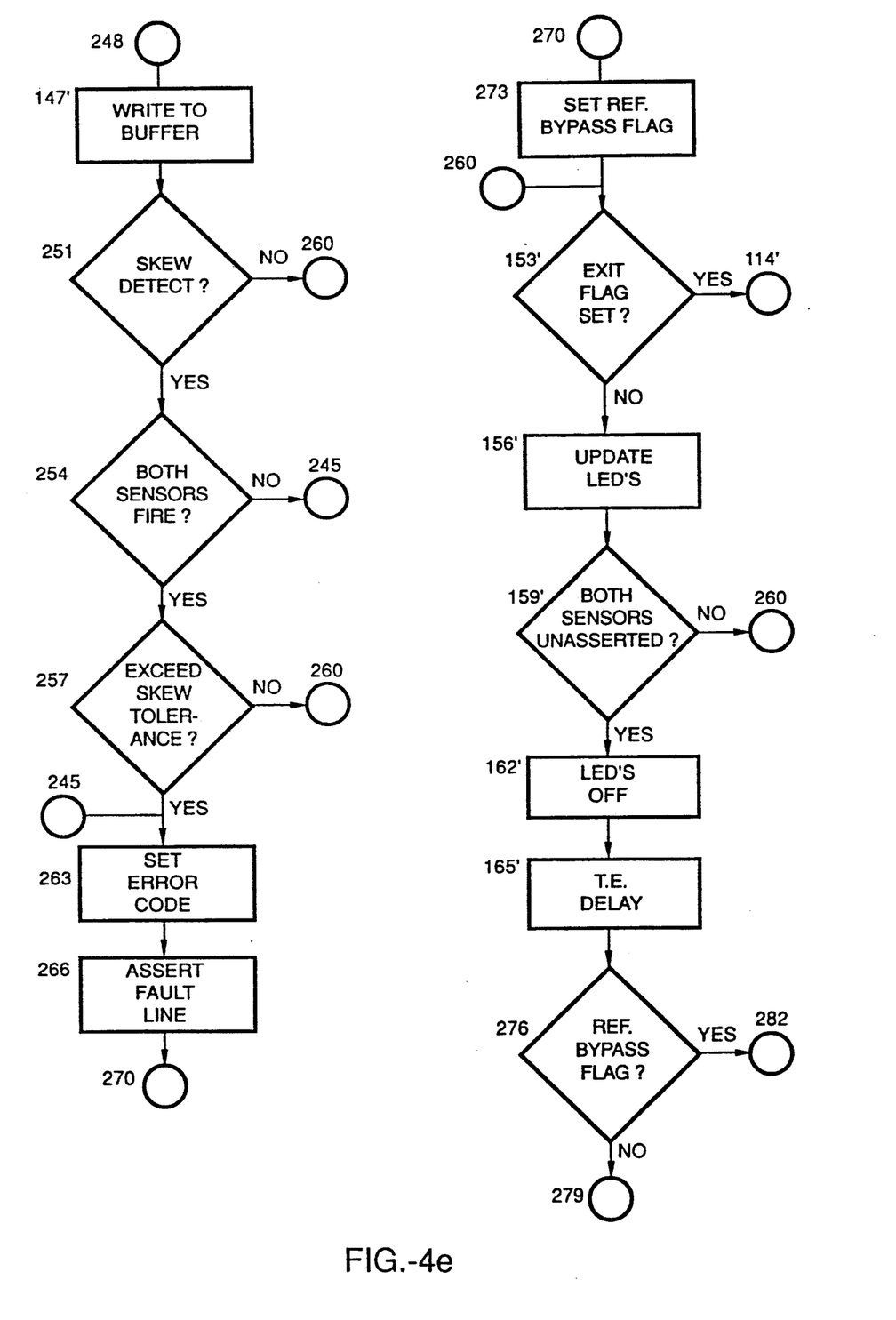
Figure 4F:
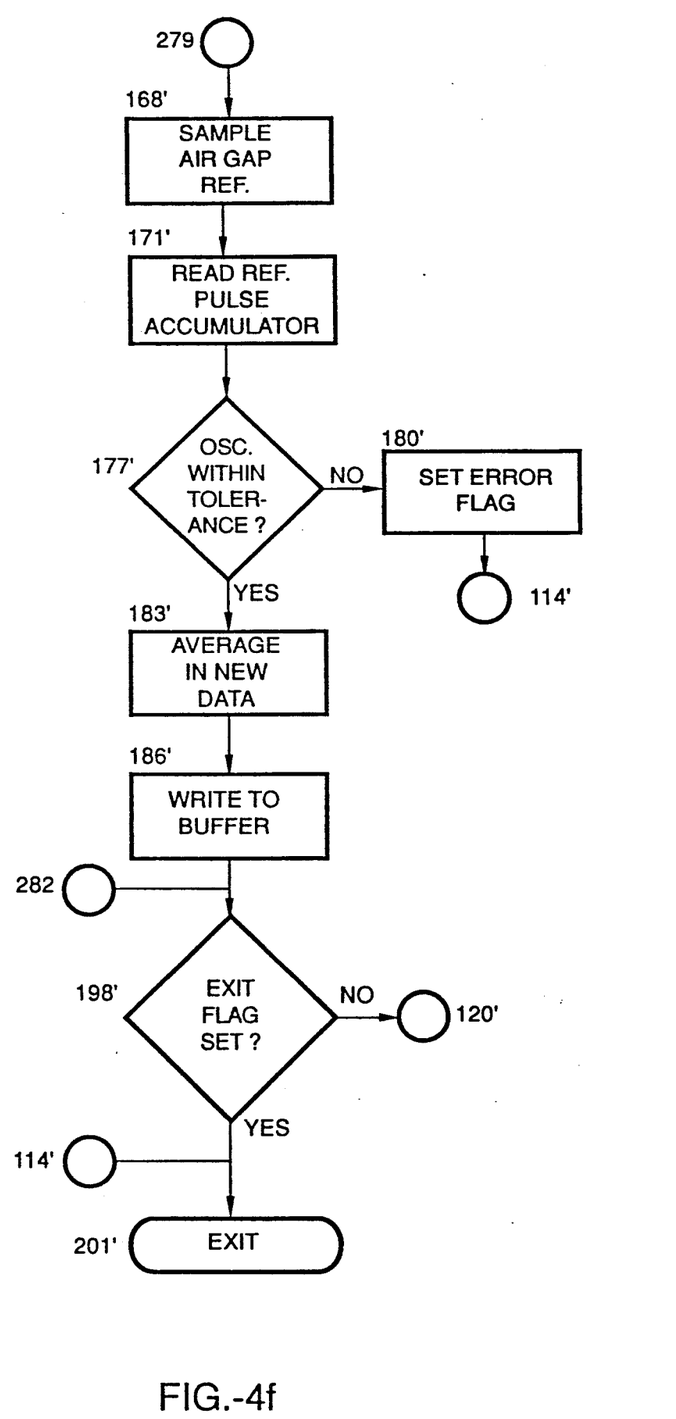

At this stage, the computer interactive mode at step 239 is initiated, as seen if FIGS. 4d, 4e, and 4f. Many of the steps in the computer interactive routine are the same or analogous to steps in the stand-alone mode, but the computer offers more versatility than having only the microcontroller. The thickness threshold is set by the computer at step 93' (each of the primes indicates an equivalent step of process between the stand-alone and computer interactive modes) to any desired value, as are the leading and trailing edge delays at step 96'. Three seed sheet packets are run through the subject probe at step 99' to generate the thickness, oscillator reference, and length seeds (preferably the closest two of the three samples are averaged for the seeds). The thickness and oscillator reference buffers are padded with the seeds at step 102'. The pointers for the thickness and reference averaged buffers are initialized at step 105'. Both visual LEDs are turned off and the sensor alive flag is cleared at step 108'. Steps 111 through 138 in the stand-alone mode are equivalent to steps 111' through 138' in the computer interactive mode except before sampling for 10 ms (step 129') the sensor alive flag is set at step 242.

If the new thickness data is within the calculated threshold values at step 138', the data is averaged in with the last ten thickness values at step 144', but if outside the threshold values branches at step 245 to an upcoming step. The routine continues at step 248 to write the new thickness data into the data buffer in a first-in-first-out manner at step 147'.

The computer interactive mode permits the detection of a skewed sheet packet 6. The program checks to see if the skew detect is enabled at step 251 and if so, did both optical sensors fire at step 254. If both sensors fired, the routine verifies if the timing between the sensor firings exceeded the maximum allowable tolerance interval at step 257 (this interval being set at any desired value). If either the skew detect at step 251 is not enabled or the maximum skew tolerance at step 257 is not exceeded the routine proceeds via step 260 to establish if the exit flag is set at step 153'. If either both sensors did not fire at step 254 or the skew tolerance interval at step 257 is exceeded, an error code is set at step 263 and the fault line is asserted at step 266. The routine continues via step 270 and sets a reference bypass flag at step 273. If the exit flag is set at step 153' the routine exits, but if not set the LEDs are updated at step 156' to reflect current sensor status. If both of the sensors are unasserted, the LEDs are turned off at step 162' and the trail edge delay is set at step 165'. If both sensors are not unasserted the routine returns at step 260 to see if the exit flag is set at step 153'.

After the trailing edge delay is set at step 165', the computer checks to see if the reference bypass flag is set at step 276 and if not, continues via step 279 down steps 168' through 186' that are equivalent to the stand-alone 168 through 186 steps. Following step 186' (writing, via first-in-first-out method, the new oscillator reference data to the data buffer) or after receiving a yes answer to if the reference bypass flag is set at step 282, steps 189, 192, and 195 of the stand-alone mode are skipped and the computer asks if the exit flag is set at step 198'. If the exit flag is not set the routine loops back at step 120', but if the flag is set the routine exits at step 201'.

Returning to FIG. 4a, if the oscillator error flag is set at step 284, the program asserts the fault line and sets an error code at step 287, followed by clearing the arm and run flags at step 290, with a looping back to step at step 228. If the oscillator error flag is not set at step 284, a query is made to see if the computer sent an exit command at step 293 and if yes, loops back through step 228, but if no, loops back through step 296. In the cases where a fault line is asserted, the computer will respond with a check fault status command.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A device for detecting the thickness of a sheet packet having at least one sheet of essentially nonconducting material during movement of the sheet packet on a path from one location to another location, comprising:
  a) a capacitance detection probe having a grounded first capacitance plate and an oscillator linked second capacitance plate opposing said grounded first capacitance plate with each said plate having a sheet packet entering edge and a sheet packet exiting edge wherein said first and said second plates are separated by a space having a dielectric constant thereby forming a capacitor through which said sheet packet moves thereby altering said dielectric constant;
  b) an oscillator circuit incorporating said capacitor as a portion of said oscillator's LC circuit wherein said oscillator has an output frequency pulse that is dependent upon said dielectric constant;
  c) a controller circuit electrically coupled to said oscillator circuit comprising:
    an address decode counter logic which addresses said capacitance detection probe and divides said oscillator output frequency pulse into a frequency suitable for accumulation by a microcontroller having a pulse accumulator circuit;
    said microcontroller for monitoring and accumulating said output frequency pulse for a predetermined time interval during which said sheet packet is between said capacitance plates wherein said accumulated output frequency pulse reflects said sheet packet's thickness;
    EPROM and memory RAM components containing instructions associated with said address decode counter logic and said microcontroller; and
  d) a first sensor associated with said capacitance detection probe for detecting the presence of said sheet packet between said capacitance plates wherein said first sensor is electrically coupled to said microcontroller and upon detecting said sheet packet sends a signal to said microcontroller; and e) a second sensor to determine packet skewing associated with said capacitance detection probe with said second sensor physically displaced from said first sensor through an angle essentially perpendicular to said sheet packet's movement path between said capacitor plates.

* * * * *